(12) United States Patent  
Ho (10) Patent No.: US 8,186,842 B2
(45) Date of Patent: May 29, 2012

(54) BACKLIGHT MODULE

(75) Inventor: Chung-Hsing Ho, Kaohsiung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 269 days.

(21) Appl. No.: 12/472,382

(22) Filed: May 27, 2009

(65) Prior Publication Data

US 2010/0265696 A1 Oct. 21, 2010

(30) Foreign Application Priority Data

Apr. 16, 2009 (TW) .............................. 98206337 U (51) Int. Cl.
 *G09F 13/04* (2006.01)
(52) U.S. Cl. ....... 362/97.3; 362/97.1; 362/613; 362/612
(58) Field of Classification Search .................. 362/613, 362/602, 97.1–97.4
See application file for complete search history.

(56) References Cited

U.S. PATENT DOCUMENTS

| 7,611,274 B2 * | 11/2009 | Hsiao et al. | 362/634 |
| 7,760,284 B2 * | 7/2010 | Murase | 349/58 |
| 7,922,380 B2 * | 4/2011 | Park | 362/631 |
| 2005/0141244 A1 * | 6/2005 | Hamada et al. | 362/612 |
| 2005/0254258 A1 * | 11/2005 | Lee | 362/612 |
| 2009/0251634 A1 * | 10/2009 | Lu et al. | 349/58 |

FOREIGN PATENT DOCUMENTS

| TW | M264520 | 5/2005 |
| TW | 200725103 | 7/2007 |
| TW | 200811531 | 3/2008 |

\* cited by examiner

*Primary Examiner* — Evan Dzierzynski (74) *Attorney, Agent, or Firm* — Jianq Chyun IP Office (57) ABSTRACT

A backlight module including a back plate, a frame, a light guide plate, and a light bar is provided. The back plate has a carrying portion and at least one holding portion, and the frame is leaned against the holding portion. The light guide plate is disposed on the carrying portion of the back plate, and one side of the light guide plate is accommodated between the holding portion and the carrying portion. The light bar includes a flexible substrate and a plurality of light emitting diodes (LEDs). The flexible substrate is disposed between the back plate and the light guide plate. The LEDs are disposed on the flexible substrate and located on the carrying portion of the back plate and by the light guide plate. Each of the LEDs has a first canopy which is located between the carrying portion and the light guide plate.

8 Claims, 9 Drawing Sheets

BACKLIGHT MODULE

CROSS-REFERENCE TO RELATED APPLICATION

This application claims the priority benefit of Taiwan application serial no. 98206337, filed on Apr. 16, 2009. The entirety of the above-mentioned patent application is hereby incorporated by reference herein and made a part of specification.

BACKGROUND OF THE INVENTION

1. Field of Invention

The present invention relates to a backlight module, and more particularly to a backlight module which can reduce manufacturing cost.

2. Description of Related Art

Figure 1:
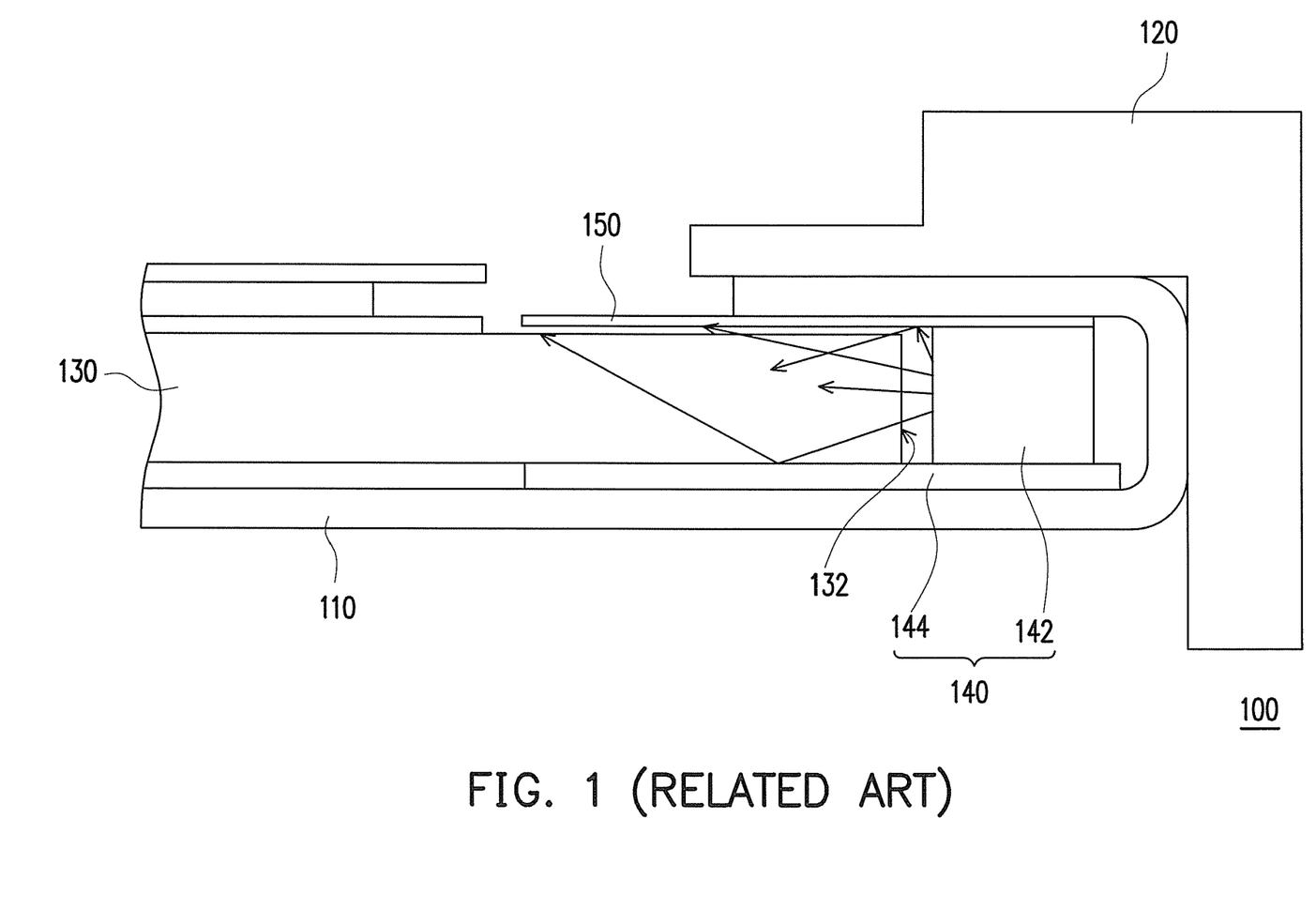
FIG. 1 illustrates a schematic cross-sectional view of a conventional backlight module.

With advancements in semiconductor industry and relevant electronic industries, digital devices such as mobile phones, digital cameras, digital video cameras, notebooks, and desktop computers have made progress to meet requirements for easy operation, multiple functionality, and attractive exterior design. However, using IT products as described above demands a suitable display screen acting as a man-machine interface, and the display screens of the products aforementioned facilitate various operations. Recently, liquid crystal displays (LCDs) have become a main stream of the display screens. However, the LCD is not self-luminescent, so that a backlight module must be employed and placed under the LCD to serve as a light source so as to make display possible. FIG. 1 illustrates a schematic cross-sectional view of a conventional backlight module. Referring to FIG. 1, a side type backlight module 100 includes a back plate 110, a frame 120, a light guide plate 130, and a light source 140. The frame 120 is leaned against the back plate 110 and the light guide plate 130 is disposed on the back plate 110. The light source 140 is disposed on a side of the back plate 110 and located by a light incident surface 132 of the light guide plate 130. A light emitted by the light source 140 enters the light guide plate 130, where a light path thereof is corrected and then the light emitted by the light source 140 is emitted.

Figure 2A:
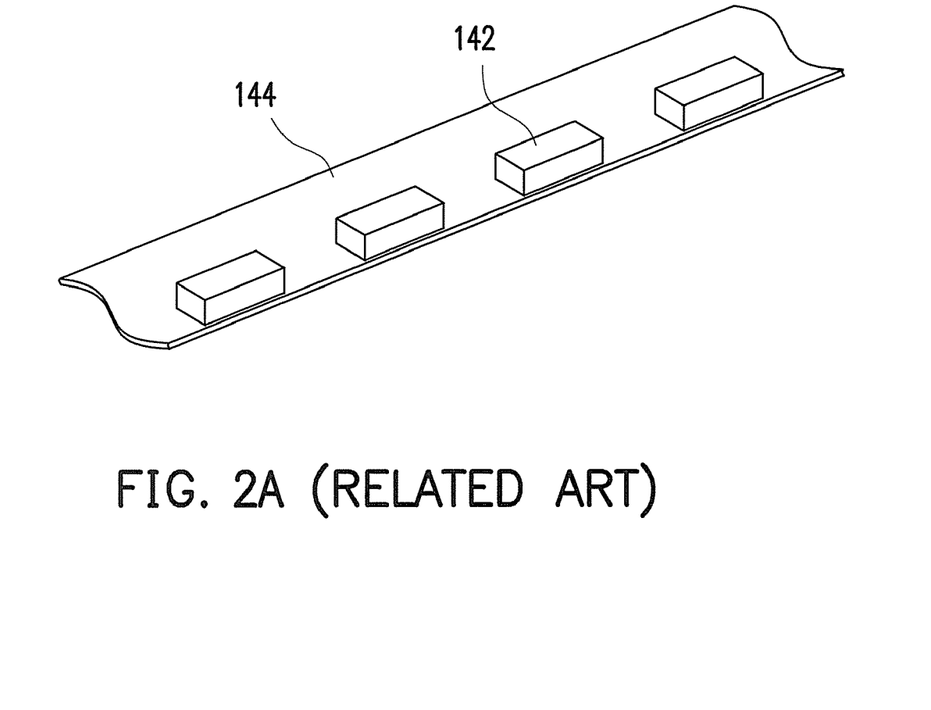
FIG. 2A is a schematic view of using conventional light emitting diodes (LEDs) as a light source.

Generally, the light source 140 incorporated in the backlight module 100 is mostly cold cathode fluorescence lamp (CCFL). In recent years, as the light emitting efficiency of light-emitting diode (LED) has continuously increased, the LED has gradually replaced the CCFL as the light source 140 of the backlight module 100. Compared with the CCFL, the LED has absolute advantages. For example, an LED is physically compact, long lasting, low voltage/current driven, durable, mercury free (pollution free), and with high emission efficiency (power saving), etc. FIG. 2A is a schematic diagram of using conventional LEDs as the light source. Referring to FIG. 2A, generally, each of LEDs 142 is a package structure, the LED 142 is thus disposed on a flexible substrate 144 to be manufactured into a light bar and then adopted as the light source 140 of the backlight module 100.

Figure 2B:
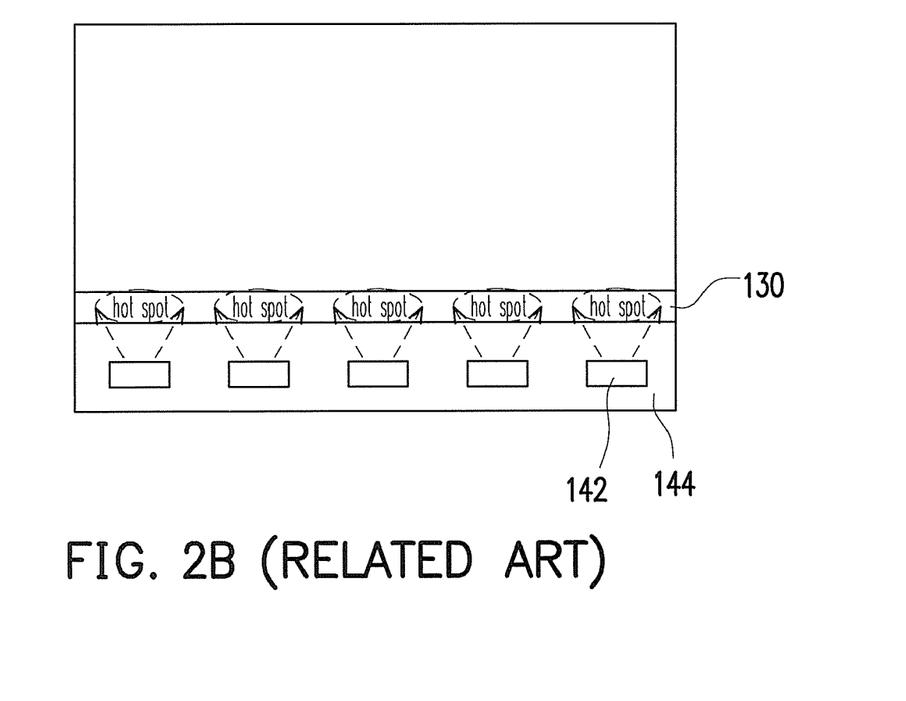
FIG. 2B is a schematic top view of the backlight module with partial hot spots in FIG. 2A.

Referring to FIG. 1 and FIG. 2A simultaneously, since gaps are present between the LEDs 142 and the light incident surface 132 of the light guide plate 130, lights with large emitting angles are leaked through the gaps, such that the LCD has partial hot spots affecting a display effect of the LCD as illustrated in a schematic top view of the backlight module having partial hot spots in FIG. 2B. When viewing the backlight module 100 of FIG. 1 from the top, some of elements such as a reflector 150, the back plate 110, and the frame 120 canopy the light source 140 in the diagram. Therefore, the reflector 150, the back plate 110, and the frame 120 are omitted in FIG. 2B.

Referring to FIG. 1, in a conventional method for solving the problem of partial hot spots, an upper reflector 150 is disposed between the light guide plate 130 and a top portion of the back plate 110 located on the light guide plate 130. Although the disposition of the upper reflector 150 prevents the problem of partial hot spots caused by the light emitted from the gap between the LED 142 and the light incident surface 132 of the light guide plate 130, a double-sided tape is required to adherently fix the reflector 150 to the back plate 110. Hence, a material cost of the double-sided tape and a manual assembling time have to be consumed.

SUMMARY OF THE INVENTION

A backlight module that effectively reduces a manufacturing cost is provided in the present invention.

A backlight module including a back plate, a frame, a light guide plate, and a light bar is provided in the present invention. The back plate has a carrying portion and at least one holding portion, and the frame is leaned against the holding portion of the back plate. The light guide plate is disposed on the carrying portion of the back plate, and one side of the light guide plate is accommodated between the holding portion and the carrying portion of the back plate. The light bar includes a flexible substrate and a plurality of light emitting diodes (LEDs). The flexible substrate is disposed between the back plate and the light guide plate. The LEDs are disposed on the flexible substrate and located on the carrying portion of the back plate and by the light guide plate. Each of the LEDs has a first canopy which is located between the holding portion and the light guide plate.

In one embodiment of the backlight module of the present invention, the back plate aforementioned is a metal back plate.

In one embodiment of the backlight module of the present invention, the flexible substrate is parallel to the carrying portion of the back plate and located between the carrying portion and the light guide plate.

In one embodiment of the backlight module of the present invention, the flexible substrate is perpendicular to the carrying portion of the back plate and located between the holding portion and the LEDs.

In one embodiment of the backlight module of the present invention, an optical film which is disposed on the light guide plate is further included. The optical film is a prism film, a diffusion film, or a brightness-enhanced film. The first canopy further extends to be adjacent the optical film.

In one embodiment of the backlight module of the present invention, a reflector disposed between the light guide plate and the back plate is further included. The reflector extends to between the flexible substrate and the light guide plate.

In one embodiment of the backlight module of the present invention, each of the LEDs further includes a second canopy which is located between the light guide plate and the carrying portion of the back plate. Moreover, the second canopy and the first canopy jointly hold two opposite surfaces of the light guide plate.

In light of the foregoing, the LEDs of the backlight module in the present invention have canopies; consequently, the problem of partial hot spots in the conventional backlight module is prevented and the light utilization rate is increased. In addition, the dispositions of canopies reduce the adoption of upper reflectors in the conventional backlight modules, thereby omitting the manufacturing cost and the assembling time.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

[First Embodiment]

Figure 3:
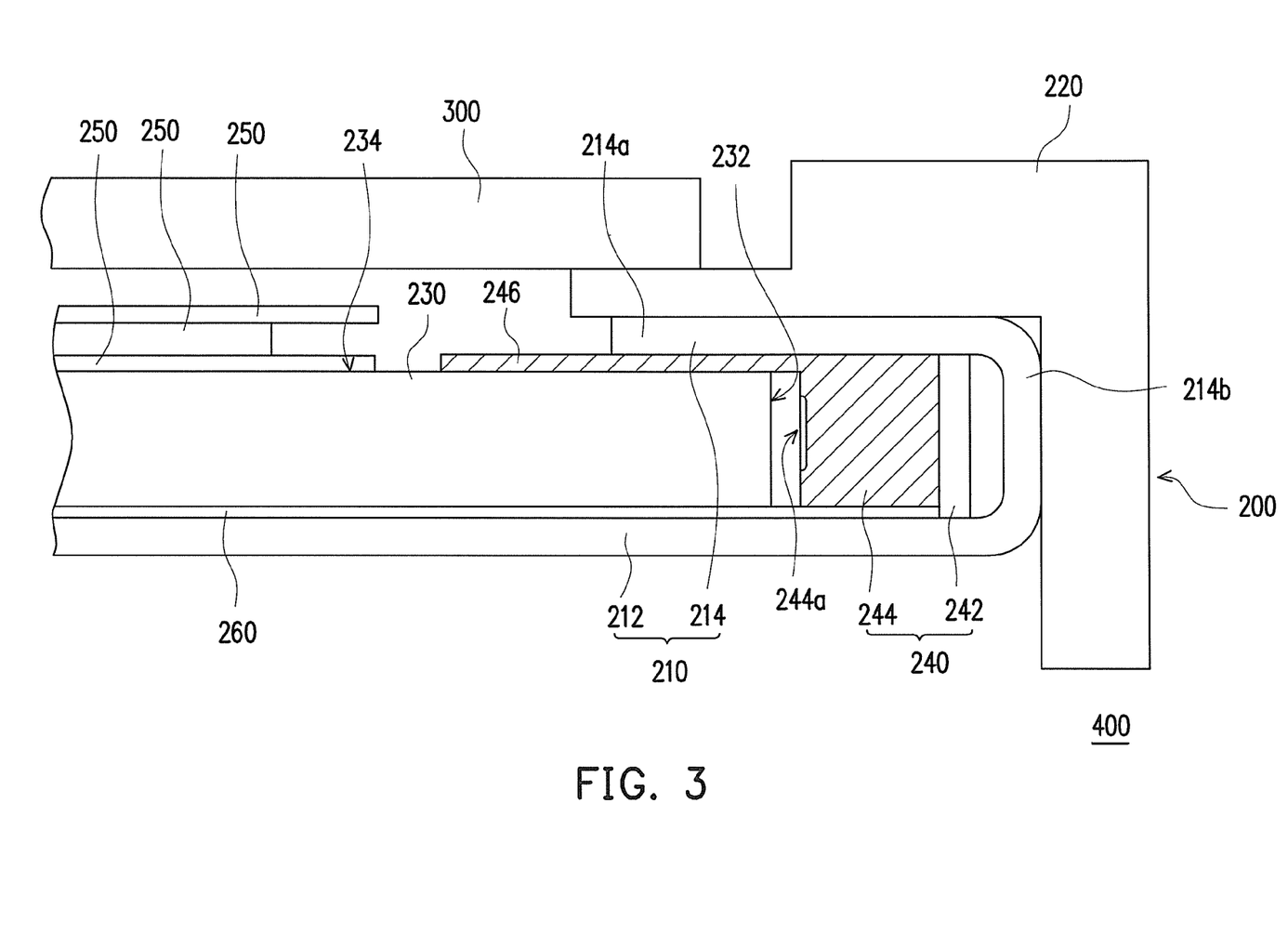
FIG. 3 is a schematic view illustrating a liquid crystal display (LCD) according to a first embodiment of the present invention.

FIG. 3 is a schematic view illustrating a liquid crystal display (LCD) according to a first embodiment of the present invention. Referring to FIG. 3, a LCD 400 includes a backlight module 200 and a LCD panel 300, where the LCD panel 300 is disposed on the backlight module 200. The backlight module 200 includes a back plate 210, a frame 220, a light guide plate 230, and a light bar 240. The back plate 210 has a carrying portion 212 and at least one holding portion 214, and the frame 220 is leaned against the holding portion 214 of the back plate 210. The light guide plate 230 is disposed on the carrying portion 212 of the back plate 210, and one side of the light guide plate 230 is accommodated between the holding portion 214 and the carrying portion 212 of the back plate 210. The light bar 240 includes a flexible substrate 242 and a plurality of light emitting diodes (LEDs) 244. The flexible substrate 242 is disposed between the back plate 210 and the light guide plate 230. The LEDs 244 are disposed on the flexible substrate 242 and located on the carrying portion 212 of the back plate 210 and by the light guide plate 230. Each of the LEDs 244 has a first canopy 246 which is located between the holding portion 214 and the light guide plate 230. The LED 244 extends to form the first canopy 246, and the first canopy 246 has a function of reflecting light. Therefore, not only is the light utilization rate of the backlight module 200 effectively enhanced, but the partial light leakage problem of the LCD 400 is also prevented so as to enhance a display quality of the LCD 400.

As aforementioned, the back plate 210 is a metal back plate, and the holding portion 214 thereof is divided into a top portion 214a and a connecting portion 214b. The connecting portion 214b perpendicularly connects to the carrying portion 212. The top portion 214a bends from the connecting portion 214b and extends to above the carrying portion 212. Moreover, the top portion 214a is generally parallel to the carrying portion 212, so that the holding portion 214 and the carrying portion 212 jointly hold one side of the light guide plate 230. In addition, the flexible substrate 242 is parallel to the carrying portion 212 of the back plate 210 and located between the connecting portion 214b of the holding portion 214, the carrying portion 212, and the LEDs 244. It should be illustrated that the first canopies 246 aforementioned are integrally formed with the LEDs 244 during the manufacturing process, and are not additionally installed on the LEDs 244. Therefore, compared to the conventional use of the upper reflector, the material cost of the double-sided tape and the manual assembling time of the backlight module in the present invention can be spared.

The backlight module 200 further includes an optical film 250 which is disposed on the light guide plate 230. The optical film 250 is a prism film, a diffusion film, or a brightness-enhanced film. In FIG. 3, a plurality of optical films 250 are stacked together. The first canopy 246 further extends to be adjacent the optical film 250 so as to reduce a gap between the first canopy 246 and the optical film 250. Therefore, the light leakage and consequently the problem of partial hot spots of the backlight module 200 are prevented. Moreover, the backlight module 200 further includes a reflector 260 which is disposed between the light guide plate 230 and the back plate 210. The reflector 260 extends to between the flexible substrate 242 and the light guide plate 230. Although the material of the back plate 210 is metal, which already obtained reflectivity, a reflectivity of the reflector 260 adopted is made higher than a reflectivity of the back plate 210, so that the light is reflected effectively and the light utilization rate is enhanced.

When a light emitting surface 244a of the LED 244 emits light, the light enters the light guide plate 230 through a light incident surface 232 of the light guide plate 230. A portion of the light is emitted from a light emitting surface 234 of the light guide plate 230 after a path thereof has been corrected by the light guide plate 230. A portion of the light in the light guide plate 230 is emitted downward to the reflector 260 and then reflected to enter the light guide plate 230 again so as to be emitted from the light emitting surface 234 of the light guide plate 230. A portion of the light, which has a greater light emitting angle, is emitted to the first canopy 246 and then reflected back to the light guide plate 230, and subsequently emitted from the light emitting surface 234 of the light guide plate 230 after been corrected by the light guide plate 230 or reflected by the reflector 260. In other words, the lights emitted by the LEDs 244 can be utilized effectively, thus the light utilization rate is increased to enhance the overall brightness of the backlight module 200. In addition, as the first canopy 246 extends to be as adjacent to the optical film 250 as possible, the gap between the optical film 250 and the first canopy 246 is small, thereby preventing the leakage of light from the gap for causing partial light leakage of the LCD 400.

Furthermore, the disposition of the first canopy 246 spares the conventional use of the upper reflector, so that the material cost of the double-sided tape and the upper reflector and the manual assembling time can be omitted.

[Second Embodiment]

The present embodiment is approximately identical to the first embodiment, and same or similar reference numbers used in the present embodiment and in the first embodiment represent the same or similar elements. Accordingly, no further description thereof is provided hereinafter.

Figure 4:
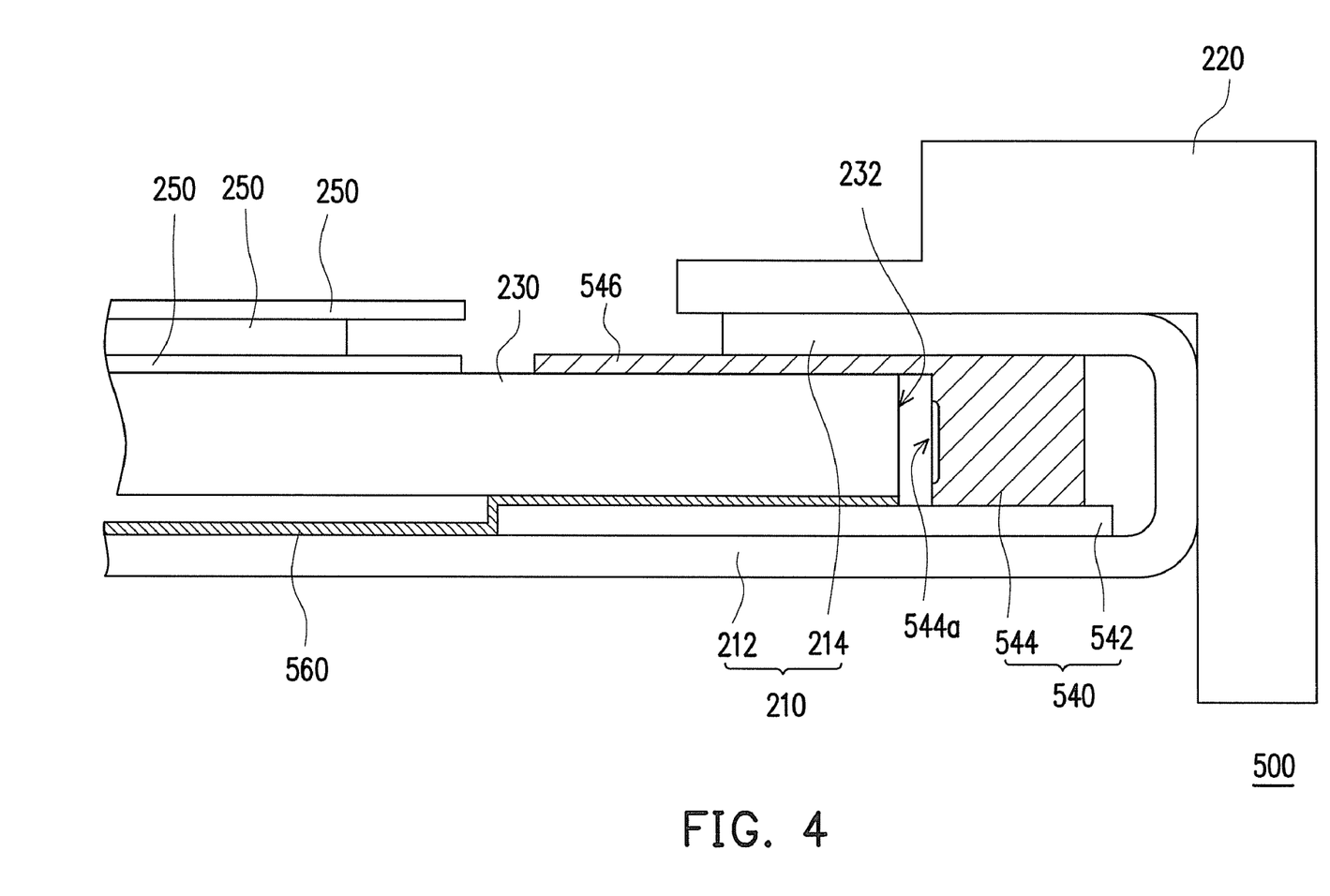
FIG. 4 is a schematic view illustrating a backlight module according to a second embodiment of the present invention.

FIG. 4 is a schematic view illustrating a backlight module according to a second embodiment of the present invention. Referring to FIG. 4, different from the first embodiment, a flexible substrate 542 of a light bar 540 of a backlight module 500 in the present invention is parallel to the carrying portion 212 of the back plate 210. Also, the flexible substrate 542 is disposed between the light guide plate 230 and the carrying portion 212 of the back plate 210. In addition, a reflector 560 which is disposed between the light guide plate 230 and the back plate 210 extend to between the light guide plate 230 and the flexible substrate 542.

Figure 5:
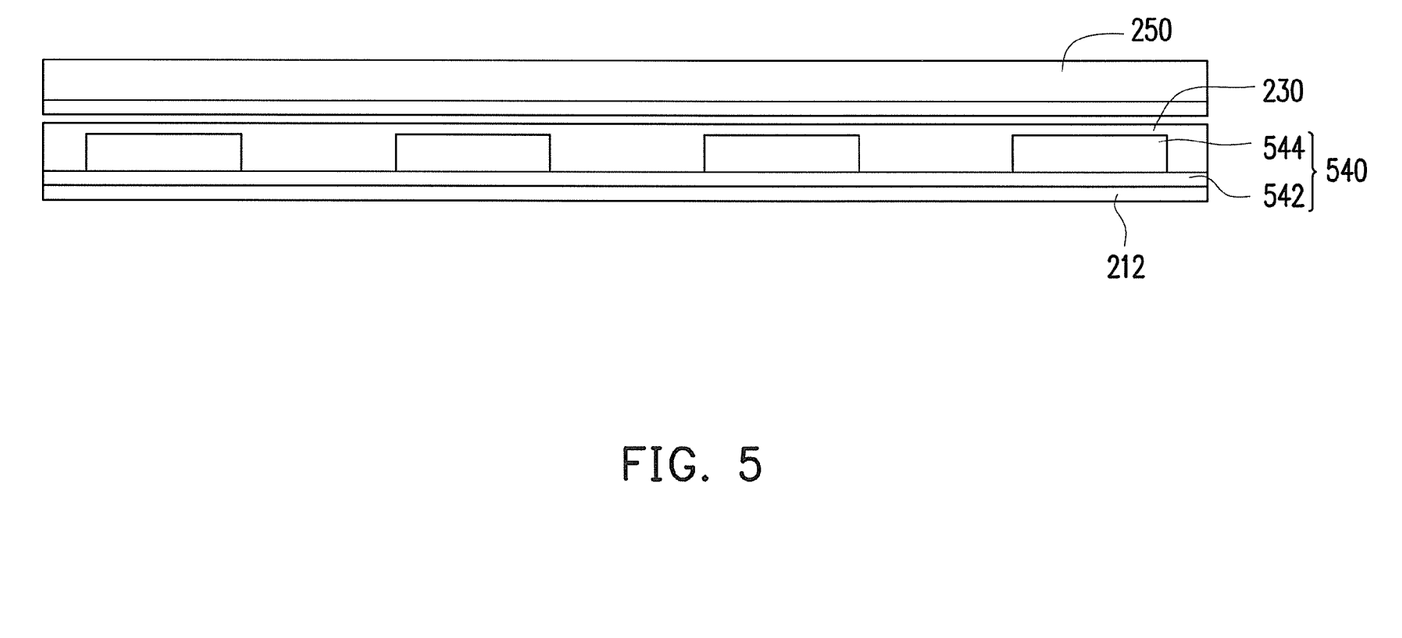
FIG. 5 is a schematic view of a light bar under normal situation.
Figure 6A:
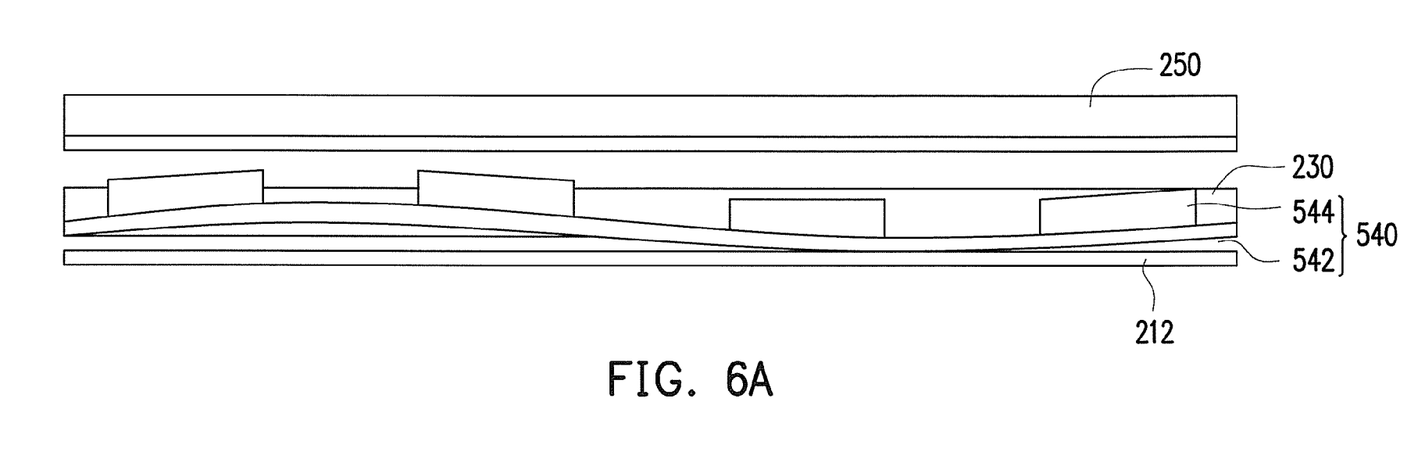
FIG. 6A is a schematic view of a twisted light bar.
Figure 6B:
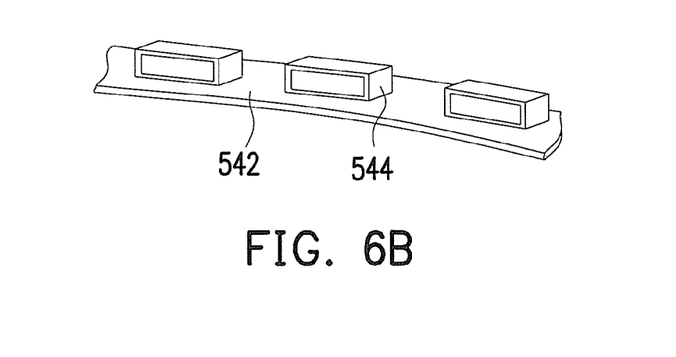
FIG. 6B is a schematic three-dimensional view of the twisted light bar in FIG. 6A.

FIG. 5 is a schematic view of a light bar under normal situation, FIG. 6A is a schematic view of a twisted light bar, and FIG. 6B is a schematic three-dimensional view of the twisted light bar in FIG. 6A. Referring to FIG. 5 and FIG. 6 simultaneously, it should be noted that the light bar 540 is usually fixed to the back plate 210 with an adhesive; however, the long periods of light emission and thermal emission of the LEDs 544 generate partial hot spots at a soldering position of each LED 544, so that the flexible substrate 542 is easily twisted. The twist of the flexible substrate 542 causes the LEDs 544 to misalign. Consequently, the locations of the LEDs 544 are affected and the light emitting angle of each LED 544 is changed, thereby causing the LEDs 544 to have uneven luminance when entering the light guide plate 230. Furthermore, through heating or moisture-absorbing expansion, a wide range of the light guide plate 230 is deformed and warped so that the light emitting surfaces 544s of the LEDs 544 do not align with the light incident surface 232 of the light guide plate 230. Moreover, the deformation and warping of the light guide plate 230 also cause the LEDs 544 to have uneven luminance when entering the light guide plate 230. The aforementioned factors all affect the overall light emitting efficiency of the backlight module 500.

However, as the first canopies 546 of the LEDs 544 are positioned close to an upper edge of the light guide plate 230 and the flexible substrate 542 is positioned close to a lower edge of the light guide plate 230, when the flexible substrate 542 is twisted due to heating or moisture-absorbing or when the light guide plate 230 is warped due to heating or moisture-absorbing, the first canopies 546 can stabilize relative angles and positions between the LEDs 544 and the light guide plate 230. As a consequence, the light emitting surfaces 544a of the LEDs 544 can correctly align to the light incident surface 232 of the light guide plate 230 to ensure the LEDs 544 to have even luminance when entering the light guide plate 230.

[Third Embodiment]

In both of the aforementioned embodiments, LEDs having first canopies are illustrated as exemplifications. However, those ordinarily skilled in the art can change the number and the disposing locations of canopies according to actual requirements.

Figure 7A:
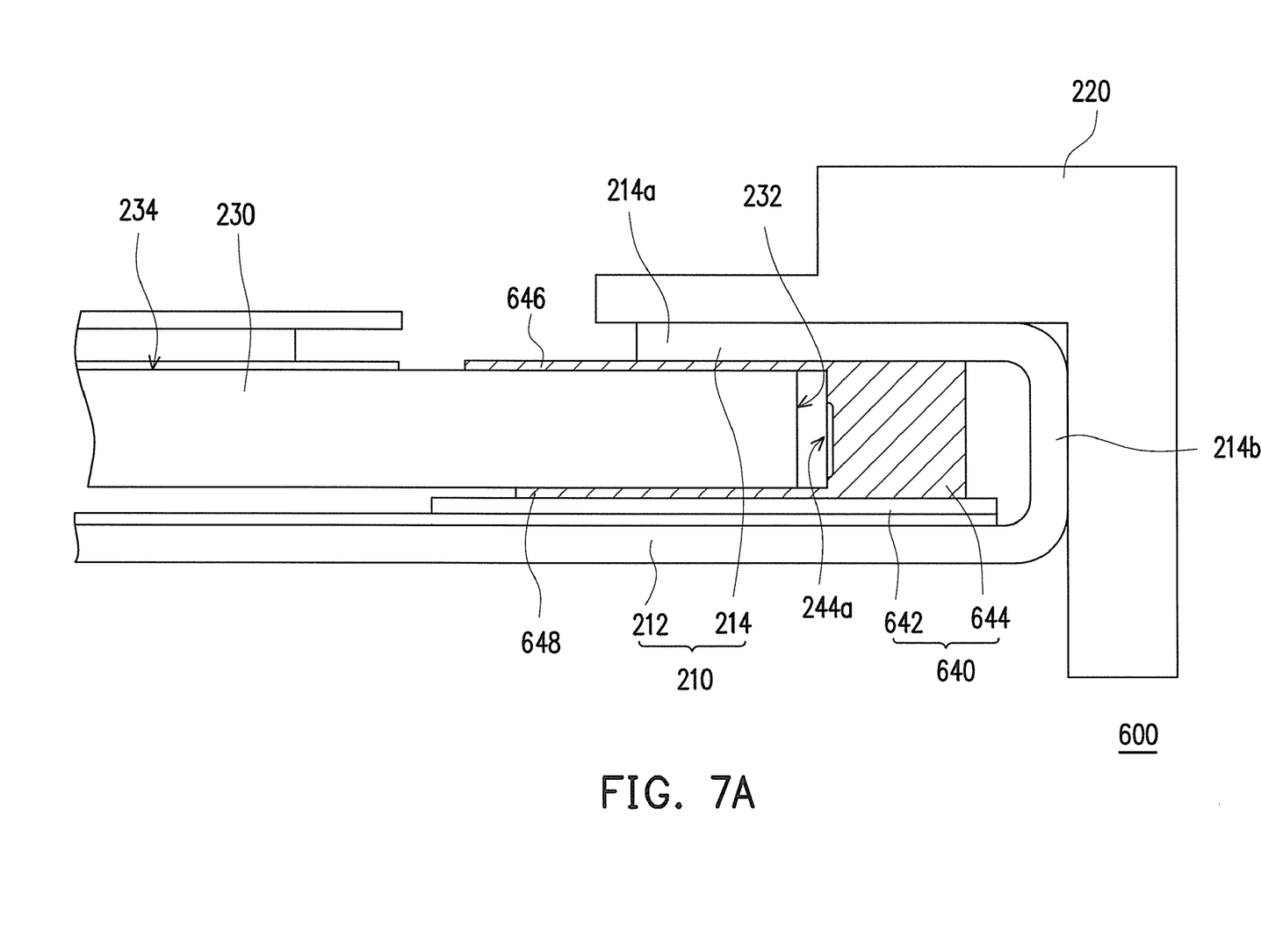
FIG. 7A is a schematic view illustrating a backlight module according to a third embodiment of the present invention.
Figure 7B:
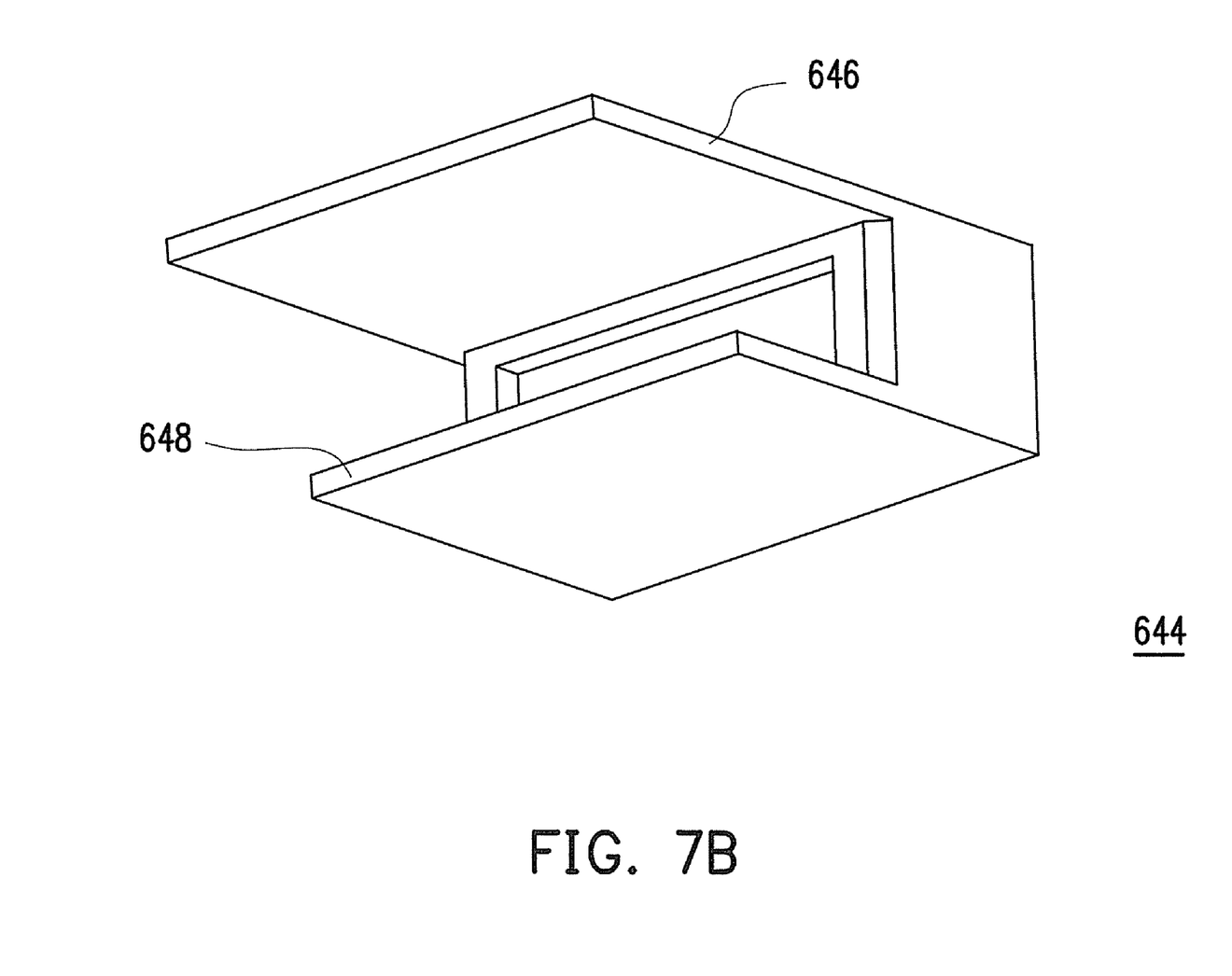
FIG. 7B illustrates a schematic three-dimensional view of LEDs in FIG. 7A.

FIG. 7A is a schematic diagram of the backlight module according to a third embodiment of the present invention. On the other hand, FIG. 7B is a schematic three-dimensional diagram of the LED in FIG. 7A. Similarly, same or similar reference numbers used in the present embodiment and in the aforementioned embodiments represent the same or similar elements. Accordingly, no further description thereof is provided hereinafter. Referring to FIG. 7A and FIG. 7B simultaneously, a plurality of LEDs 644 of a light bar 640 of a backlight module 600 each has a first canopy 646 and a second canopy 648. The first canopy 646 is disposed between the top portion 214a of the holding portion 214 and the light guide plate 230. The second canopy 648 is disposed between the light guide plate 230 and the flexible substrate 642. The disposition of the second canopy 648 spares the dispositions of the reflectors 260 in the first and the second embodiments, so that the manufacturing cost and the assembling time can be saved.

Figure 8:
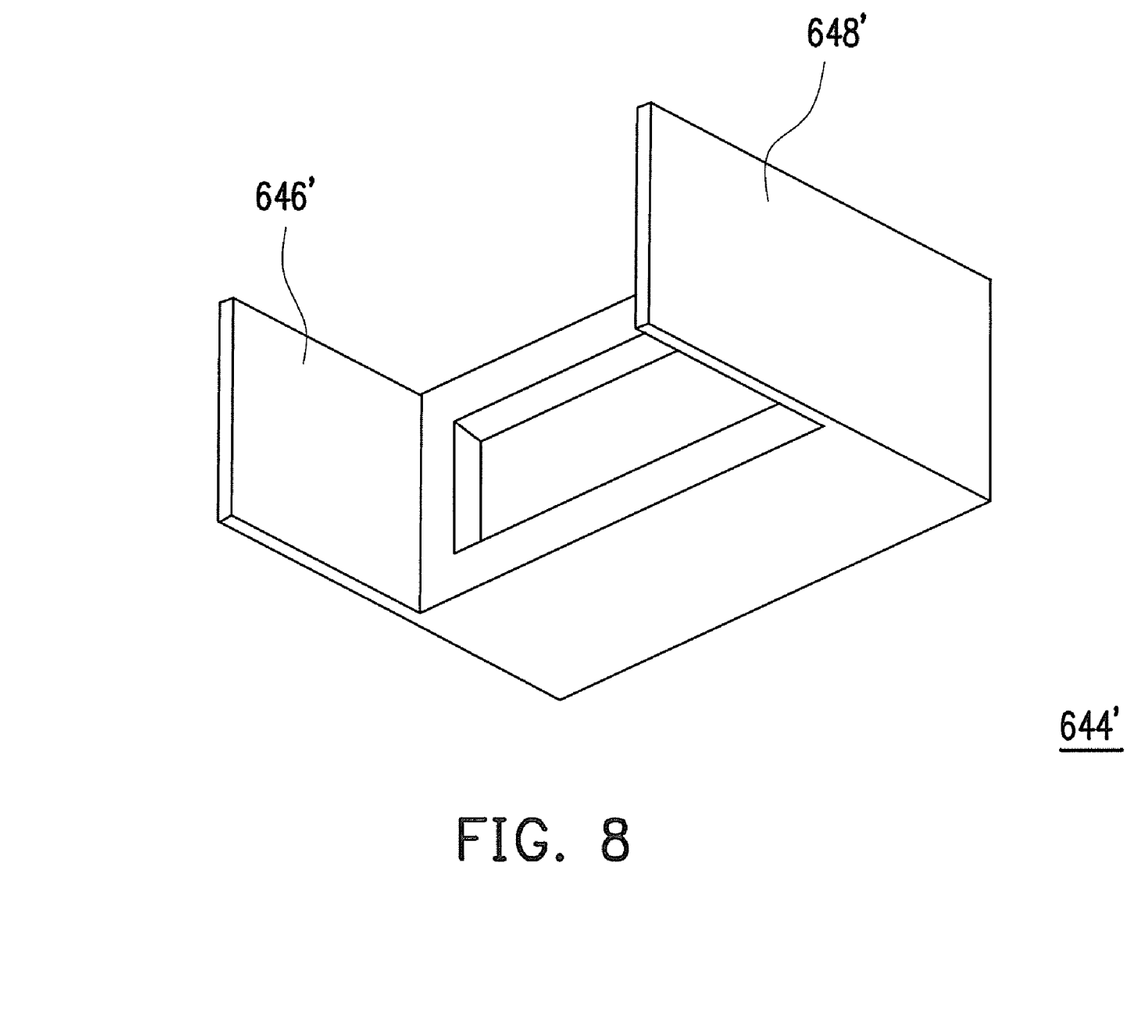
FIG. 8 is a schematic view illustrating another type of the LEDs.

Obviously, the dispositions of the first canopies and the second canopies of the LEDs can be altered according to actual requirements. FIG. 8 is a schematic view illustrating another type of the LEDs. Referring to FIG. 7B and FIG. 8 simultaneously, the first canopy 646 and the second canopy 648 of each of the LEDs 644 in FIG. 7B are located at the upper and lower sides. On the contrary, the first canopy 646' and the second canopy 648' of each of the LEDs 644' in FIG. 8 are located at the left and right sides. Herein, the first canopy 646' and the second canopy 648' of each LED 644' are configured to hold the upper and lower edges of the light guide plate 230 (marked in FIG. 7A).

In summary, in the backlight module of the present invention, since the LEDs of the light bar have the canopies that extend to the upper edge of the light guide plate and are adjacent to the optical film, the leakage of light is prevented from the gaps between the light emitting surfaces of the LEDs and the light incident surface of the light guide plate to avoid the problem of partial hot spots in the LCD. Hence, the dispositions of the canopies increase the light utilization rate effectively, elevate the overall brightness of the backlight module, and consequently enhance the display quality of the LCD. Moreover, the dispositions of canopies spare the adoptions of the upper reflectors in the conventional backlight modules, thereby saving the manufacturing cost and the assembling time.

Moreover, when the LED has only one canopy, the canopy and the flexible substrate are positioned close to the upper edge and the lower edge of the light guide plate respectively. Hence, when the flexible substrate is twisted due to heating or moisture-absorbing or when the light guide plate is warped due to heating or moisture-absorbing, the canopy can stabilize the relative angle and position between the LED and the light guide plate to ensure the light emitting surface of the LED can align with the light incident surface of the light guide plate and therefore prevent misalignment from occurring. As a result, the LEDs can have even luminance when entering the light guide plate, so that the backlight module has better light emitting quality.

As aforementioned, when the LED has two canopies, the two canopies are positioned close to the upper and the lower edges of the light guide plate respectively. Therefore, the relative angles and positions between the LED and the light guide plate can be further stabilized for the backlight module to obtain better light emitting quality. In addition, the adoptions of the upper and lower reflectors in the backlight module are omitted to save the manufacturing cost and assembling time.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A backlight module, comprising:
   a back plate, having a carrying portion and at least one holding portion;
   a frame, leaning against the holding portion of the back plate;
   a light guide plate, disposed on the carrying portion of the back plate, and one side of the light guide plate accommodated between the holding portion and the carrying portion of the back plate; and
   a light bar, comprising:
      a flexible substrate, parallel disposed between the carrying portion of the back plate and the light guide plate, wherein the flexible substrate is closely sandwiched by the carrying portion of the back plate and the light guide plate; and
      a plurality of light emitting diodes (LEDs), disposed on the flexible substrate and located on the carrying portion of the back plate and by the light guide plate, wherein each of the LEDs comprises a first canopy, each first canopy is integrally formed with the corresponding LED and located between the holding portion and the light guide plate.

2. The backlight module as claimed in claim 1, wherein the back plate is a metal back plate.

3. The backlight module as claimed in claim 1, further comprising an optical film disposed on the light guide plate.

4. The backlight module as claimed in claim 3, wherein the first canopy extends to be adjacent to the optical film.

5. The backlight module as claimed in claim 3, wherein the optical film is a prism film, a diffusion film, or a brightness-enhanced film.

6. The backlight module as claimed in claim 1, further comprising a reflector disposed between the light guide plate and the back plate.

7. The backlight module as claimed in claim 6, wherein the reflector extends to between the flexible substrate and the light guide plate.

8. The backlight module as claimed in claim 1, wherein each of the LEDs further comprises a second canopy located between the light guide plate and the flexible subtstrate, and the second canopy and the first canopy jointly hold two opposite surfaces of the light guide plate.

* * * * *